United States Patent
Riach, Jr.

(10) Patent No.: US 6,891,101 B2
(45) Date of Patent: May 10, 2005

(54) NON-INVASIVE MAGNETIC ARRANGEMENT FOR A VEHICLE AND METHOD OF USE

(76) Inventor: George Riach, Jr., 10424 Cary Cir., Cypress, CA (US) 90630

( * ) Notice: Subject to any disclaimer, the term of this patent is extended or adjusted under 35 U.S.C. 154(b) by 0 days.

(21) Appl. No.: 10/260,920

(22) Filed: Sep. 30, 2002

(65) Prior Publication Data

US 2004/0060720 A1 Apr. 1, 2004

(51) Int. Cl.[7] ................................................. H05K 9/00
(52) U.S. Cl. .................. 174/35 R; 174/32; 174/35 MS; 174/35 GC; 174/135; 439/92
(58) Field of Search .......................... 439/92; 174/35 R, 174/32, 35 MS, 35 GC

(56) References Cited

U.S. PATENT DOCUMENTS

| | | | | |
|---|---|---|---|---|
| 4,940,444 A | * | 7/1990 | Russell | 446/446 |
| 4,993,985 A | * | 2/1991 | Bass et al. | 446/133 |
| 5,605,348 A | * | 2/1997 | Blackburn et al. | 280/735 |

* cited by examiner

Primary Examiner—Dean A. Reichard
Assistant Examiner—Jinhee Lee

(57) ABSTRACT

An electromagnetic frequency (EMF) grounding outlet for a vehicle. The grounding outlet has a permanent magnet or magnetic pad on top of which a passenger's and/or driver's feet can rest or on which the person may sit. The EMF grounding outlet may be affixed to a floor or pedal of the vehicle. The North magnetic field of the magnet faces up toward the person in the vehicle and the South magnetic field faces down toward the vehicle floor.

19 Claims, 4 Drawing Sheets

NON-INVASIVE MAGNETIC ARRANGEMENT FOR A VEHICLE AND METHOD OF USE

FIELD OF THE INVENTION

The present invention relates to an electromagnetic frequency ground and a method of use. More particularly, the present invention to an EMF ground magnet for a passenger vehicle such as a car or truck to help prevent adverse effects of EMF on blood and tissue of the body.

BACKGROUND OF RELATED ART

The present invention relates to a method and apparatus to avoid molecular body stress, driver and passenger fatigue, irritation, anger and hostility while driving or riding in a vehicle, caused by back electromagnetic frequencies (EMF). The present invention provides a North magnetic field placed under foot pedal such as a gas or diesel foot pedal and/or brake pedal or the floor of a vehicle to help ground out the adverse electromagnetic frequencies circulating in the body.

There can be from 10 to 25 or even more different kinds of electric motors in automobiles and trucks. Typically, these motors use magnetic forces to translate electrical signals into linear motion. Most cars and trucks also have numerous sensors such as those in anti-lock brakes and airbags which make further use of magnets. Additionally, the number of magnets in a typical car or truck is expected to further increase as the number of all electric cars increases. These electric motors and sensor magnets produce an undesired back or wandering electromagnetic frequency (EMF) which is magnetically pulled into the moisture of the body.

It only takes from about 15 minutes to a half an hour for the back EMF caused by the motor and sensors to settle in the blood and tissue of the body of a driver or passenger seated in an automobile or truck. The unnatural secondary current flow of the back EMF makes an abnormal circuit within the blood and tissues of the body. The back EMF also invades the tissue and moisture of an ungrounded body causing it to discharge oxygen carried by normal blood cells thus reducing the dissolved oxygen available to the cells. This can cause molecular degeneration and aggravate blood and tissue conditions, as well as cause numerous other adverse, unnatural effects including driver or passenger fatigue, irritation, nausea, and dehydration.

Typically, the Earth's natural magnetic field serves to ground out back EMF so it does not settle in a body. The Earth's natural magnetic field makes a normal circuit back to negative ground. However, as one travels in an automobile or truck, the iron and steel chassis of the vehicle along with steel belted tires obstruct the normal magnetic effect of the Earth. This reduces the normal magnetic effect which passes through the body as a consent DNA molecular charger. As a result, the passenger(s) and driver suffer the adverse effects of back EMF. With the use of properly designed magnetic field arrangements within the automobile or truck, one can mimic the Earth's negative natural grounding effect and reduce the side effects of back motor EMF and secondary frequency fields.

It is an object of the present invention to provide a vehicle with an EMF grounding outlet. It is also an object of the present invention to provide a vehicle with a preventative grounding outlet that is operational prior to starting the vehicle's engine. The EMF grounding outlet comprises magnets or magnetic pads on top of which a passenger's and/or driver's feet can rest or on which the person may sit. The EMF grounding outlet mimics the natural magnetic North field of the Earth.

When an ungrounded human body is subjected to back EMF, it becomes an alternating, recharging, discharging circuit field. When this happens, the activated electro-current energy is often so subtle that the average driver or passenger accepts it as normal. Further, automobile and truck back EMF electro-chemical stress is often not apparent to the driver or passenger of the vehicle because it usually mimics common symptoms such as dehydration, fatigue and stress which are accepted as normal. It is an object of the present invention to provide vehicle passengers and drivers with a negative body grounding outlet to prevent stress and symptoms caused by back EMF. Animals such as pets riding the vehicles may also benefit from an EMF grounding outlet.

It is another object of the present invention to provide an improved driver and passenger blood flow where more dissolved oxygen is available in the blood so as to avoid dehydration, stress, fatigue, irritation, erythrochyte aggregation and free radical damage. It is also an object of the present invention to prevent abnormal driver and passenger blood flow so more dissolved oxygen is available and negative ions are released normally from the water in the blood to the tissue and organs of the body as if the person were standing or walking on the Earth's surface. This in turn helps avoid systems such as dehydration, stress, fatigue and irritation.

It is another object of the present invention to provide an apparatus to help prevent motion sickness, dizziness and other driver and passenger ailments due to dehydration and nausea from back EMF.

It is another object of the present invention to provide a long lasting, low maintenance and inexpensive magnetic device which is easy to manufacture to act as an EMF grounding outlet.

SUMMARY OF THE INVENTION

The present invention is an EMF grounding outlet for a passenger vehicle. The EMF grounding outlet comprises a magnet or magnetic pad that rests under the driver's and/or passenger's feet or body. The North magnetic field of the magnet is directed up toward the driver or passenger, while the South magnetic field faces the vehicle floor.

The EMF grounding outlet may be housed as part of the brake or accelerator pedal of a vehicle or it may be a portable or permanent magnetic device placed on the metal floor of a vehicle.

Back EMF comes from a variety of sources. Within a vehicle motors, magnets, as well as sensors and gauges that make use of magnets all create back EMF. Because the vehicle frame absorbs the normal magnetic forces of the Earth the back EMF is not grounded. Instead an abnormal circuit is created and the back EMF settles in the tissue and moisture of the people and animals riding in the vehicle. As a result, drivers and passengers experience dehydration, stress, fatigue, irritation, erythocyte aggregation, free radical damage, motion sickness, dizziness, nausea and other ailments. Given the commonness of these symptoms, people do not recognize them as abnormal.

The EMF grounding outlet replicates the Earth's natural North magnetic field and discharges the unwanted EMF. Through a circuit, the normal grounded blood and tissue of the body eliminate unwanted EMF. The North magnetic field of the EMF grounding outlet helps prevent the abnormal circuit caused by back or wandering EMF of the vehicle, its motors and its various magnetic sensors.

The invention will be described in connection with a preferred embodiment. However, it should be understood that it is not intended to limit the invention to that embodiment. Other objects and advantages of the invention will become apparent upon reading the following detailed description and upon reference to the drawings in which:

DETAILED DESCRIPTION OF THE INVENTION

Figure 1:
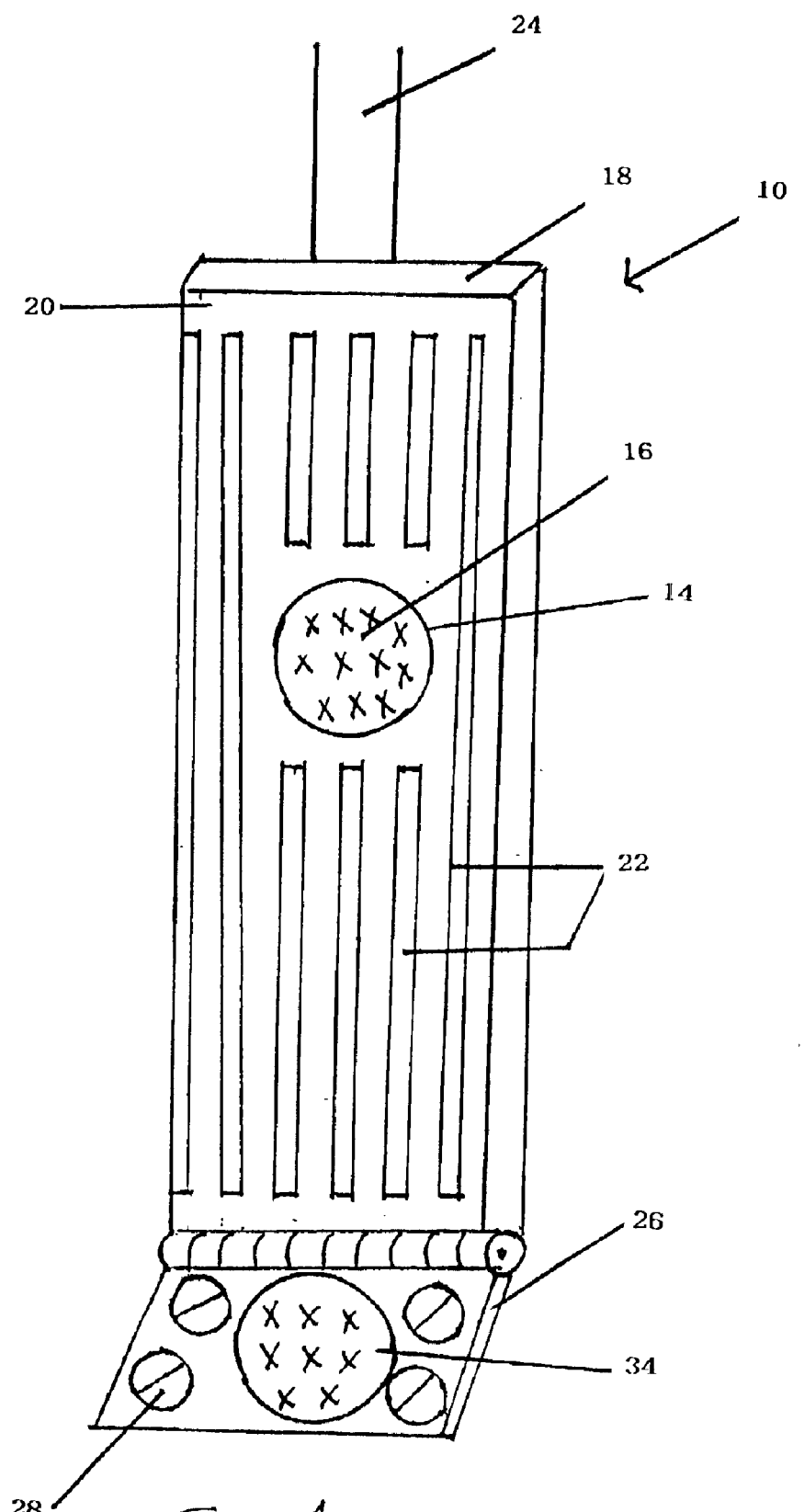
FIG. 1 is a top view of an accelerator pedal with an EMF grounding outlet.

Turning now to FIG. 1, a top view of an accelerator pedal 10 with an EMF grounding outlet 14 is shown. The EMF grounding outlet is mounted to the pedal such that the magnetic field penetrates the moisture from the bottom of the shoed foot to help create a circuit that will ground out the back EMF. The North field (represented by Xs) pull of the magnet 16 under the foot acts as a negative grounding outlet which enables normal blood flow through the veins and arteries and puts the human body to its highest and best regenerative ability as if the person were standing on the Earth's surface. In the preferred embodiment, the EMF grounding outlet is located in a car or truck (not shown). However, the invention is not limited to cars and trucks and may be placed in other vehicles such as buses, golf carts and the like.

The negative EMF grounding outlet creates a negative magnetic field within the automobile or truck. The magnet acts as natural grounding outlet which reduces the toxic side effects and adverse effects that back EMF and secondary frequency fields can have on the body.

The accelerator pedal 10 comprises a pedal 18. The upper surface 20 of the pedal 18 has a series of non-skid treads 22 to prevent the driver's foot (not shown) from slipping off the pedal. The pedal 18 is operatively connected (directly or indirectly) with the carburetor, fuel injector, engine and/or power supply by a shaft 24 or other known connection means.

In the preferred embodiment, the pedal 18 and the shaft 24 are mounted for movement. Optionally, the pedal 18 has a hinge 26 for mounting the pedal 18 to the floor (not shown) of the vehicle. In one embodiment, the hinge is mounted directly on the floor using a series of screws 28. Other known connectors can be used to mount the hinge to the floor.

Figure 4A:
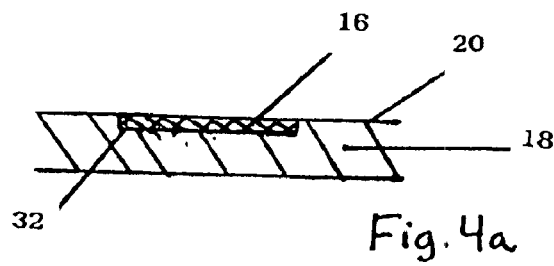
FIGS. 4 a–c are cross-sectional views of a pedal with an EMF ground.
Figure 4B:
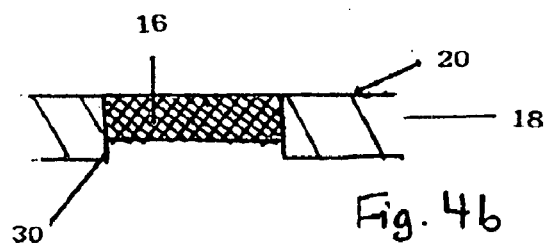
Figure 4C:
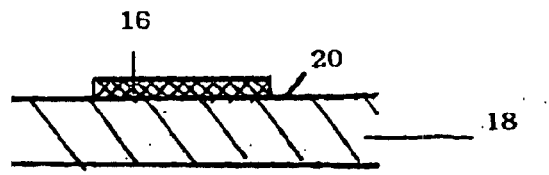

FIGS. 4a–4c show alternative embodiments of the present invention. Preferably, the pedal has a passage 30 in it as shown in FIG. 4a. Most preferably, the passage 30 is located approximately where the ball of the foot would push against the pedal 18. A magnet 16 is secured within the passage 30. Preferably, the passage 30 and the magnet 16 are circular. However, other shaped magnets may be used. For example, the passage and associated magnet may be rectangular.

In another embodiment, shown in FIG. 4b, the pedal 18 has a recess 32 and the magnet is mounted within the recess.

In an alternative embodiment, shown in FIG. 4c, the magnet 16 may be mounted directly on the pedal 18. The magnet may be mounted on the upper surface 20 of the pedal 18 or the lower surface. The recess may be in either the upper surface 20 or the lower surface of the pedal. In an other alternative embodiment, a magnetic pad 58 is affixed to the pedal 10.

In another embodiment, several magnets are placed directly on the pedal. In another embodiment, the pedal may have a plurality of recesses or passages with a magnet secured within each one.

In the preferred embodiment, the North negative magnetic field of the magnet is facing up toward the upper surface 20 of the pedal and the driver's foot and the South positive magnetic field faces the floor.

Optionally, the hinge also has a magnet 34 device. Preferably, the magnet is mounted in a recess in the hinge. However, the magnet 34 may be mounted directly on the hinge 26 or secured in a passage in the hinge 26. The magnet 34 on the hinge 26 is located approximately where the heel of the foot would rest when the foot is pushing lightly against the accelerator pedal 10. The North magnetic field of the magnet on the hinge is facing up and the South magnetic field is facing down, away from the foot and body.

Figure 2:
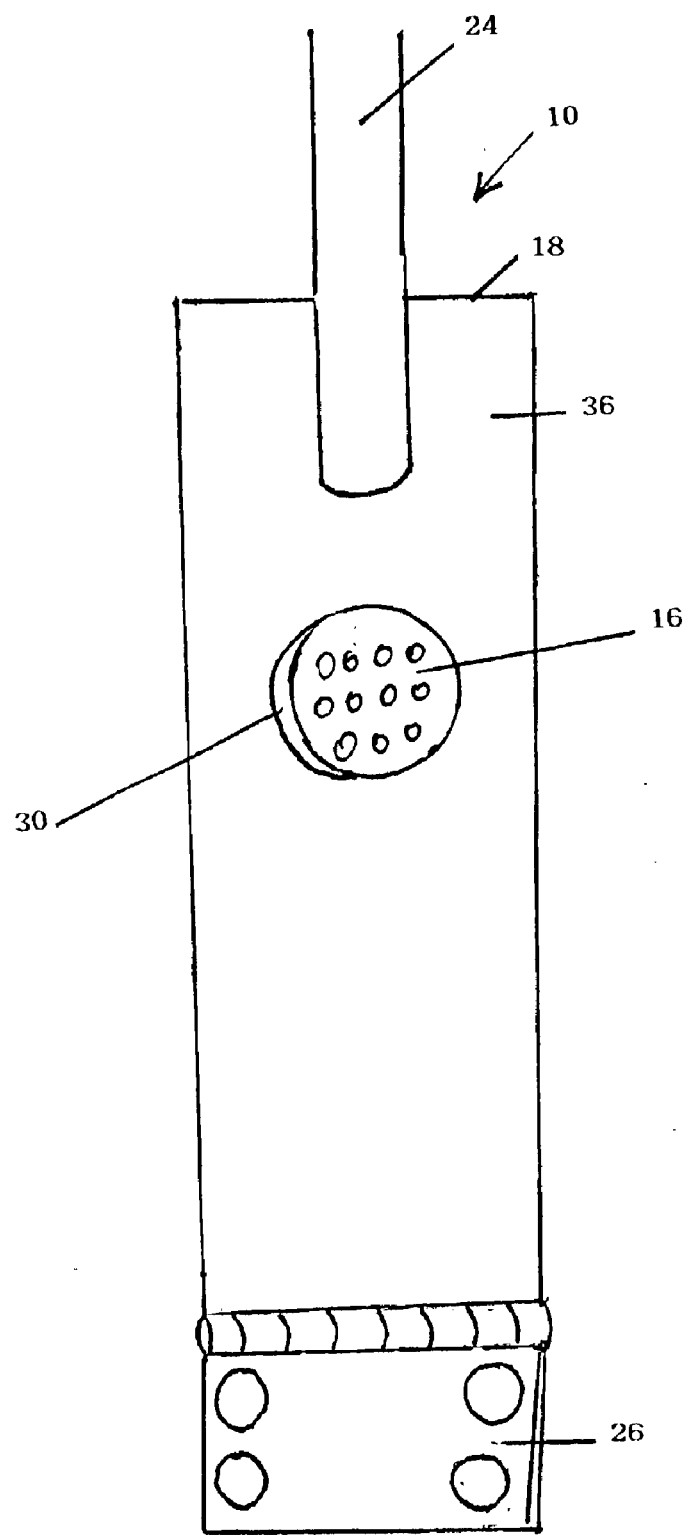
FIG. 2 is a bottom view of an accelerator pedal with an EMF grounding outlet.

Turning now to FIG. 2 the lower surface 36 of the accelerator pedal of FIG. 1 is shown. The magnet 16 is mounted in the passage 30 of the pedal 18 so the North magnetic field faces the foot and the South magnetic field faces the floor (not shown). In another embodiment of the present invention, the magnet is affixed directly to the lower surface 36 of the pedal. Alternatively, the magnet 16 may be mounted in a recess in the lower surface 36 of the pedal. Preferably, the magnet is aligned such that the South magnetic field of the magnet 16 is facing the floor (not shown) of the vehicle and the North magnetic field penetrates the pedal 10.

The inventive pedal may be placed in a newly manufactured automobile or retrofitted onto an existing automobile. The foot pedal may be manufactured with an integral grounding outlet including a recess or passage with a magnet secured within. Similarly, a hinge may be manufactured with an integral EMF grounding outlet. Alternatively, a magnet or magnetic pad may be permanently affixed to the pedal or it may be a removeably affixed to the pedal. For example, an owner might purchase a do-it-yourself EMF grounding outlet kit for a pre-sold automobile. The kit might include a magnetic pad with adhesive on the side with south magnetic field. The magnetic pad is applied to the upper surface of the foot pedal such that the North magnet faces up toward the driver.

Figure 3:
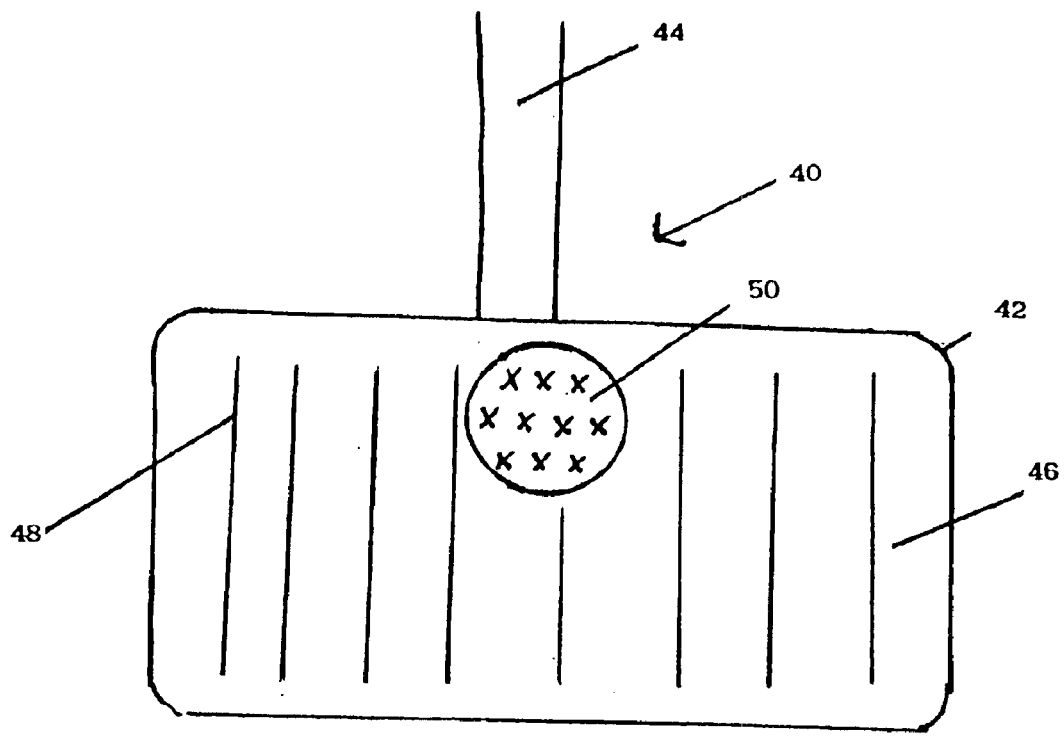
FIG. 3 is a top view of a brake pedal with an EMF grounding outlet.

Turning now to FIG. 3, a brake pedal 40 is shown. The brake pedal 40 comprises a pedal 42 and is operatively connected (directly or indirectly) to the brakes (not shown) via a shaft 44 or other means for breaking. On the upper surface 46 of the pedal 42 there are a series of treads which prevent the foot from slipping off the pedal. Located on the pedal 42 approximately where the ball of the foot would press on the pedal is an EMF grounding outlet. The EMF grounding outlet comprises a magnet 50 or magnetic pad with a North magnetic field facing up. The North magnetic field of the magnet 50 or magnetic pad faces up toward the driver's foot (not shown) and the South magnetic field faces the vehicle floor (not shown). The negative North magnetic field penetrates the moisture through the bottom of shoe and foot to help ground out back EMF.

In the preferred embodiment, the pedal 42 has a passage with a magnet 50 secured therein. Alternatively, the magnet 50 may be mounted in a recess in the pedal 42. The recess can be in either the top side or the underside of the pedal. In yet another embodiment, a magnet 50 or magnetic pad is mounted directly on the pedal 42. The magnet 50 may be mounted on the topside or on underside (not shown) of the brake pedal. In another embodiment, a magnetic pad is mounted on the floor of the vehicle under the pedals.

Figure 5:
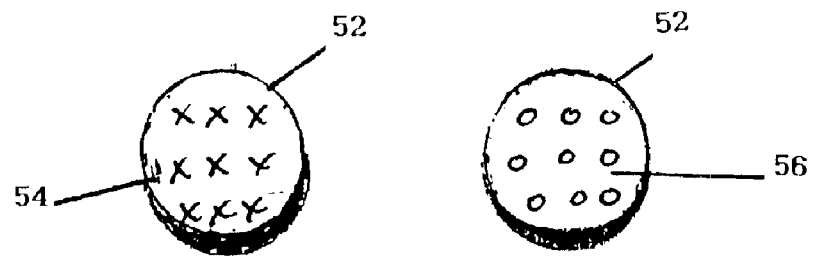
FIG. 5 is a top view of a pair of magnets.

Turning now to FIG. 5, a pair of magnets 52 for use as EMF grounding outlets are shown. Preferably, the magnets 52 are permanent magnets. More preferably, the magnets are made of a solid state bipolar material. However, other magnetic materials such as a magnetic alloy made of steel, iron, neodymium, or a flexible magnetic material may be used.

In the preferred embodiment, the magnet has a negative North pole on one side of the magnet, denoted by Xs 54. On the other side of the magnet, it has a South pole, denoted by Os 56. In the preferred embodiment, the magnetic field 54 of the magnet approximates the Earth's magnetic field. In the preferred embodiment of the invention, the magnetic field of the magnet 52 is approximately same magnitude as the Earth's magnetic field or approximately 0.04 gauss. However, higher gauss magnetic materials maybe used.

These magnets 52 may be permanently affixed to a pedal 18, 42 or floor or removable. For example, a passenger may bring a grounding outlet with him. When the passenger places the grounding outlet on the vehicle floor, the magnet 52 may be placed anywhere on the metal floor so long as the South pole 56 of the magnet is against the floor and the North pole 54 of the magnet is upright under the feet and/or body. A driver or passenger may move a removeable grounding outlet between the pedals of two or more cars.

Figure 6:
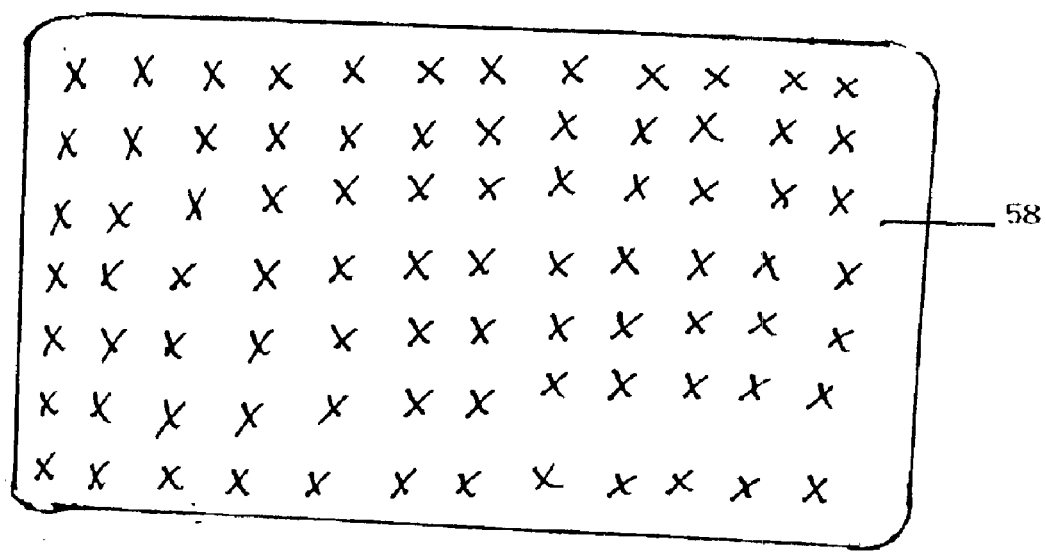
FIG. 6 is a top view of a flexible magnetic pad.

Turning now to FIG. 6, a EMF grounding outlet pad 58 is shown. The pad 58 comprises at least one magnet. In the preferred embodiment, the magnet substantially covers the pad. in an alternative embodiment the pad has a plurality of magnets on its surface, each with the same magnetic field (either all South or all North) on the surface. The pad 58 may be applied to a brake or gas pedal 10, 40 such that the North magnetic field faces the driver to ground out back EMF. Alternatively, the magnetic pad 58 may be applied anywhere on the metal floor of the vehicle provided the South magnetic field is against the floor and the North magnetic field is upright facing the feet or body of the passenger. The pad 58 may be applied on top of or underneath the floor mats. Further, it may be applied directly to the floorboard. Preferably, the pad 54 is a permanent magnet. More preferably, it is made out of a flexible magnetic material. Most preferably, the pad is flexible. The pad 54 may be permanently attached to a pedal or vehicle floor, such as with an adhesive. Alternatively, it may be removable.

In another embodiment, the EMF grounding outlet pads 58 may be placed directly under the feet of the passengers and/or driver by placing one pad or a plurality of pads throughout the floor of the vehicle. This will help prevent blood aggregation. Strategically placing the negative EMF grounding outlets 58 on the vehicle floor will help prevent blood aggregation of all kinds. The most preferable placement of the grounding outlet is to such that the North field is against the foot and the South field is away from the foot.

In yet another embodiment, magnetic pads 58 are built into the floor and become a permanent part of the vehicle's floor.

What is claimed is:

1. An electromagnet frequency (EMF) grounding system for a vehicle comprising:

at least one permanent magnet affixed to a vehicle and at least one occupant, wherein said at least one permanent magnet has a magnetic North field on one side and a magnetic South field on an opposite side, said magnetic North field is directed up and said magnetic South field is directed down toward a floor of the vehicle and at least one body part of said at least one occupant is located adjacent to said at least one permanent magnet, for at least a period of time, said at least one body part selected from the group consisting of feet or gluteal area, wherein said magnet grounds the at least one occupant from EMF when the at least one body part is adjacent to the magnet.

2. The electromagnet frequency (EMF) grounding system of claim 1 wherein said at least one permanent magnet is affixed to the floor of the vehicle.

3. The electromagnet frequency (EMF) grounding system of claim 2 wherein said at least one permanent magnet is removably affixed to the floor.

4. The electromagnetic frequency (EMF) grounding system of claim 1 wherein said at least one body part is adjacent to said at least one permanent magnet when the vehicle is on.

5. The electromagnet frequency (EMF) grounding system of claim 4 wherein EMF is grounded from the at least one occupant during a time while the at least one body part is adjacent to said at least one permanent magnet.

6. The electromagnetic frequency (EMF) grounding system of claim 1 wherein the at least one occupant is the driver of the vehicle.

7. The electromagnetic frequency (EMF) grounding system of claim 1 wherein the at least one occupant is a human.

8. The electromagnetic frequency (EMF) grounding system of claim 1 wherein the at least one occupant is an animal.

9. The electromagnet frequency (EMF) grounding system of claim 1 wherein EMF is grounded from the at least one occupant during a time while the at least one body part is adjacent to said at least one permanent magnet.

10. The electromagnet frequency (EMF) grounding system of claim 1 wherein said magnetic north field penetrates said at least one body part of said at least one occupant.

11. An electromagnet frequency (EMF) grounding system for a vehicle comprising:

at least one permanent magnet affixed to a vehicle and at least one occupant in said vehicle, wherein said at least one permanent magnet has a magnetic north field on one side and a magnetic south field on an opposite side, said magnetic north field penetrates at least one body part of said at least one occupant, and said magnetic South field is directed down toward a floor of the vehicle, wherein the magnet grounds the at least one occupant.

12. The electromagnet frequency (EMF) grounding system of claim 11 wherein said at least one permanent magnet is affixed to the floor of the vehicle.

13. The electromagnet frequency (EMF) grounding system of claim 11 wherein said at least one permanent magnet is removably affixed to the floor.

14. The electromagnetic frequency (EMF) grounding system of claim 11 wherein said at least one body part is adjacent to said at least one permanent magnet for at least a portion of a time when the vehicle is on.

15. The electromagnetic frequency (EMF) grounding system of claim 14 wherein EMF is grounded from the at least one occupant during a time while the at least one body part is adjacent to said at least one permanent magnet.

16. The electromagnetic frequency (EMF) grounding system of claim 11 wherein the at least one occupant is the driver of the vehicle.

17. The electromagnetic frequency (EMF) grounding system of claim 11 wherein the at least one occupant is a passenger in the vehicle.

18. The electromagnetic frequency (EMF) grounding system of claim 11 wherein the at least one occupant is an animal.

19. The electromagnet frequency (EMF) grounding system of claim 11 wherein EMF is grounded from the at least one occupant during a time while the at least one body part is adjacent to said at least one permanent magnet.

* * * * *